United States Patent
Alcendor et al.

(10) Patent No.: US 6,337,899 B1
(45) Date of Patent: Jan. 8, 2002

(54) SPEAKER VERIFICATION FOR AUTHORIZING UPDATES TO USER SUBSCRIPTION SERVICE RECEIVED BY INTERNET SERVICE PROVIDER (ISP) USING AN INTELLIGENT PERIPHERAL (IP) IN AN ADVANCED INTELLIGENT NETWORK (AIN)

(75) Inventors: Tommy Alcendor, Boynton Beach, FL (US); Zygmunt A. Lozinskie, Winchester (GB); Baiju D. Mandalia, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/052,730

(22) Filed: Mar. 31, 1998

(51) Int. Cl.[7] .......................... H04M 1/64; H04M 3/42; H04M 3/50; G06F 11/00; G06F 15/16
(52) U.S. Cl. ............... 379/88.17; 379/67.1; 379/88.13; 379/201; 379/219; 379/900; 379/907; 370/263; 709/229
(58) Field of Search .............................. 379/67.1, 88.01, 379/142, 202, 205, 206, 207, 209, 210, 34, 35, 201, 219, 220, 242, 243, 88.13, 88.16, 88.17, 900, 903, 907, 908; 370/260, 261, 263; 709/202, 203, 229; 345/326, 327; 704/244, 250, 256, 260

(56) References Cited

U.S. PATENT DOCUMENTS

| | | | | |
|---|---|---|---|---|
| 5,165,008 A | * | 11/1992 | Hermansky et al. ............ | 395/2 |
| 5,583,920 A | * | 12/1996 | Wheeler, jr. ............. | 379/88.01 |
| 5,889,958 A | * | 3/1999 | Willens ................. | 395/200.59 |
| 5,913,192 A | * | 6/1999 | Parthasarathy et al. ..... | 704/256 |
| 5,915,008 A | * | 6/1999 | Dulman ...................... | 379/201 |
| 5,940,487 A | * | 8/1999 | Bunch et al. ............... | 379/201 |
| 5,958,016 A | * | 9/1999 | Chang et al. ............... | 709/229 |
| 5,973,683 A | * | 10/1999 | Cragun et al. .............. | 345/327 |
| 5,987,611 A | * | 11/1999 | Freund ....................... | 713/201 |
| 6,005,845 A | * | 12/1999 | Svennesson et al. ........ | 370/260 |
| 6,018,567 A | * | 1/2000 | Dulman ....................... | 379/34 |
| 6,028,600 A | * | 2/2000 | Rosin et al. ................ | 345/327 |
| 6,072,483 A | * | 6/2000 | Rosin et al. ................ | 345/335 |
| 6,088,007 A | * | 7/2000 | Shioya ......................... | 345/10 |
| 6,161,128 A | * | 12/2000 | Smyk ......................... | 709/205 |

* cited by examiner

Primary Examiner—Allan Hoosain
(74) Attorney, Agent, or Firm—Jon A. Gibbons; Fleit, Kain, Gibbons, Gutman & Bongini P.L.

(57) ABSTRACT

A method for controlling subscription services delivered to a user by an Internet Service Provider (ISP) coupled to an Automated Intelligent Network (AIN) telephone system with at least one central office switching system. An intelligent peripheral subsystem is connected to the central office switching system, via a call connection channel. The intelligent peripheral subsystem providing at least one auxiliary call processing capability via the call connection channel and provides a telephony speaker authentication method for selectively authorizing updates to user subscription services types provided by the ISP, wherein each of the subscription services types include one or more service options. The method for controlling subscription services including: a) prompting for a voice response; b) authenticating a user's voice response pattern by performing a speaker-dependent cepstrum matching algorithm with previously stored samples of the user's voice response, and if the user's voice response pattern is positively authenticated with previously stored samples, then performing the steps of: c) presenting a menu of user subscription types, each with available AIN service options; and d) responding to a user selection of at least one user subscription types, each with service option, by activating a service option selected by the user, wherein the service option is governed by said ISP by regulating one or more Uniform Resource Locator (URL) addresses received by a user subscriber device from said ISP over a telecommunication line.

24 Claims, 4 Drawing Sheets

(Home Control)

SPEAKER VERIFICATION FOR AUTHORIZING UPDATES TO USER SUBSCRIPTION SERVICE RECEIVED BY INTERNET SERVICE PROVIDER (ISP) USING AN INTELLIGENT PERIPHERAL (IP) IN AN ADVANCED INTELLIGENT NETWORK (AIN)

CROSS-REFERENCE TO RELATED APPLICATIONS

Not applicable.

BACKGROUND OF THE INVENTION

1. Field of the Invention

The invention disclosed broadly relates to the field of telephony Interactive Voice Response (IVR) systems, and more particularly relates to the field of speaker verification for authorizing updates to user-provided services using an Intelligent Peripheral (IP) in an Advanced Intelligent Network (AIN).

2. Description of the Related Art

Over the past few years, the number of new services and features offered over enhanced telephone networks has grown. These enhanced telephone networks are known as AINs. Telephony control networks conforming to AIN architecture contains intelligent subsystems for controlling switched traffic and user services such as call waiting, call forwarding, voice announcements, voice response, and keyboard response. These intelligent subsystems, called "Intelligent Peripherals" (IPs), are configured for specific regional calling services.

The increase in the variety of telephony services and features offered over these AIN systems are further accelerated by the recent congressional legislation permitting, for the first time, a single business entity to offer telephone, cable and Internet services. Both cable operators and telephone providers are vying to compete in this newly deregulated communications arena. As new services are added, a need exists to enable subscribers to easily and securely modify their subscription preferences. For example, a parent may desire to block certain types of television programs from being received based on criteria such as the violence, obscenity, and other offensive content not appropriate for children. In response to this parental desire, the television industry has voluntarily implemented rating identifiers that are transmitted along with their broadcast program content. These voluntary rating identifiers are designed to work with technologies such as the V-chip to block undesired television programs. The V-chip technology is scheduled to be widely commercially available by the year 2000. A problem plaguing the providers of V-chip enabled televisions and devices is how to provide parents an easy and secure method to program which television program content is filtered out by these V-chip enabled devices. The challenge is designing a system that, on one hand, the parents find easy enough to selectively update the filtering criteria and, on the other hand, make the system secure enough to prevent children from defeating the parental selections. Security techniques such as Personal Identification Numbers (PINs) analogous to credit and bank card PINs are being explored by the providers of the V-chip technology. Each user PIN would be matched to a particular V-chip system. However a concern still exists of how to address the problem when a parent loses or forgets his or her uniquely assigned PIN. Requiring the supplier of a V-chip compatible device to keep customer records for each V-chip device sold is cumbersome. Moreover, if a V-chip compatible television is later privately sold, the subsequent purchaser may have difficulty establishing an ownership privilege in order to be given a replacement PIN. As an alternative solution, several broadcasters are beginning to offer these same types of selective filtering services of television program content but these services are controlled by the broadcaster or local cable company. One example is pay-perview, where a subscriber is able to purchase the rights to view a given show. Typically, the broadcaster broadcasts the authorization code over to a television converter box, where the code is received and the selection de-scrambled for viewing. Those subscribers not buying the rights to view a specified broadcast are presented a scramble version of the broadcast making the program content indiscernible. This broadcaster-based filtering is being extended using AIN systems to other services such as filtering out generally available network television based on rating identifiers to provide parents secure control over their children's programs. The ability for parents to selectively and securely control the content in these broadcaster-based filtering system is a problem. Therefore a need exists to provide an easy and secure method to update television filtering services over AIN systems.

Another example of a need for users of AIN services are in the area of Internet content filtering. Many parents wish to limit their children's unsupervised access to certain types of Internet content. To accomplish this many parents purchase PC products like NetNanny and CyberPatrol to limit access to Web sites containing content that includes violence, obscenity, and other offensive content. These enduser products allow parents to select words, phrases, sites, pictures and content, which the parent deems inappropriate for their children to view. In the meantime, many traditional telephone and cable providers have begun offering access to the Internet through local access services. The Internet access providers, known as Internet Service Providers (ISPs), have begun offering additional Internet services such as these filtering functions but instead of running on the end-user's PC, these ISP based services run at the ISP gateway itself. These parental selectable Internet criteria as in the television access filtering previously discussed above, need an easy and secure way to enable parents to update their Internet filtering preferences. Therefore, a need exists to provide easy and secure method to update Internet filtering services over AIN systems.

Still another category of service beginning to be offered by the telephone and cable TV providers is the ability to program and control home appliances. One plan is to treat every appliance in a home with a unique Internet Uniform Resource Locator (URL) address or Internet address for a given subscriber's home. Appliance services connected through the URLs or through other distributed means such as LANs can be controlled by the service provider. For example, a service provider may offer the control of home systems such as security control, heating ventilation and air conditioning control, lighting control, etc. over the Internet. The provider of these services desires to provide a simple and secure method for the subscriber to a service to control these appliances. Returning to the home lighting control example, the provider of the service may offer subscribers the ability to control lights, by turning them on or off. One AIN service may be to enable a homeowner, away from home, to turn on or off lights in their home over the telephone. This would make the homeowner's house appear occupied during his/her absence, creating a deterrence to theft. Accordingly, a need exists to provide an easy and secure method to update subscription services for home control over AIN systems.

Still other services offered through AIN systems such as banking, billing, electronic commerce, insurance and other finical services depend on identification and authentication. Typically the providers of these services have depended on userids combined with passwords or PINs techniques to authenticate users. However, the use of passwords and userids over AIN systems are susceptible to interception and theft. Therefore, a need exists for a method to update subscription information for financial services offered over AIN systems as well.

SUMMARY OF THE INVENTION

A method for controlling subscription services delivered to a user by an Internet Service Provider (ISP) coupled to an Automated Intelligent Network(AIN) telephone system with at least one central office switching system. An intelligent peripheral subsystem is connected to the central office switching system, via a call connection channel. The intelligent peripheral subsystem providing at least one auxiliary call processing capability via the call connection channel and provide a telephony speaker authentication method for selectively authorizing updates to user subscription services types provides by the ISP, wherein each of the subscription services types include one or more service options. The method for controlling subscription services including:a) prompting for a voice response;b) authenticating a user's voice response pattern by performing a speaker-dependent cepstrum matching algorithm with previously stored samples of the user's voice response, and if the user's voice response pattern is positively authenticated with previously stored samples, then performing the steps of:c) presenting a menu of user subscription types, each with available AIN services option, by activating a service option selected by the user, wherein the service option is governed by said ISP by regulating one or more Uniform Resource Locator(URL) addresses received by a user subscriber device from said ISP over a telecommunication line.

BRIEF DESCRIPTION OF THE DRAWING(S)

DESCRIPTION OF a PREFERRED EMBODIMENT

Figure 1:
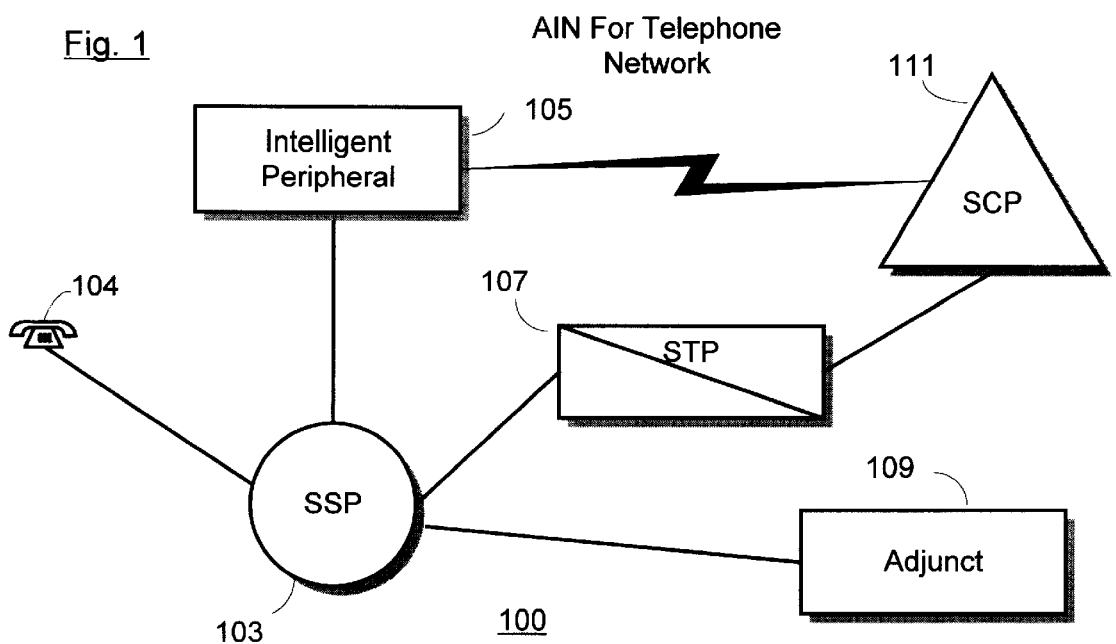
FIG. 1 is a functional block diagram of a telephone network conforming to AIN architecture according to the present invention.

FIG. 1 illustrates a network conforming to public switched telephone network ("PSTN") architectures for an Advanced Intelligent Network ("AIN") 100. Further information about AIN architecture can be obtained by referring to one or more of the following published documents, whose teachings are incorporated herein by reference.

Bellcore, GR-2802-CORE, Advanced Intelligent Network (AIN) 0.X Issue 1, Generic Requirements, Issue 2 Dec. 2, 1993.

Bellcore, GR-1129-CORE, Advanced Intelligent Network (AIN) 0.2 switch Intelligent Peripheral Interface (IPI) Generic Requirements, ILC 1E, November 1994.

ISC-IP Interface Specification, Bellcore, SR-3511.

The AIN system 100 is associated with a regional node of the PSTN. A telephone unit 101, available to a "local" PSTN user, links to the regional node through a signal switch points (SSP) complex 103. The SSP 103 connects to an intelligent peripheral (IP) system 105, a hierarchical network of signaling transfer points (STPs) 103, and an adjunct system 109.

The IP 103 provides switched connections for telephone calls passing through the respective regional node (e.g., between local and trunk lines traversing the node), and controls service applications associated with respective calls (conferencing, voice announcements, speech recognition applications, call forwarding, etc.). The SSP 103 supports communications between telephones such as the unit 101 and the IP 103 using ISDN (Integrated Services Digital Network) connections, SS7 ISUP (ISDN User Part) or similar connections.

The SSP 103 communicates through the STPs with a service control point (SCP) 111, using a known signaling system and the SS7 packet-switched message format. The IP 103 and SCP 111 coordinate service logic functions (e.g. functions required to play voice announcements) using a known "1129+" signaling protocol.

Call connections between local telephones such as the unit 101 and other local telephones are formed by operations of the IP 103 and the SSP 103. Connections between local telephone 101 and remote telephones associated with remote SSPs and IPs are formed by transmission of call setup messages between SSP 103 and the remote SSPs via STP 107 (and other STPs if appropriate) as well as SCP 111 (and remote SCPs if appropriate). Upon determining that a path exists for a required remote call connection, SSP 103 and the other SSPs cooperate with respective IPs to establish the connection.

Message communications, between SSP's such as SSP 103 and both respective IPs such as IP 105 and associated SCPs such as SCP 111, are required to set up call connections and administer telephone user services associated with respective calls. Such message communications are conducted through a common channel signaling (CCS) network formed between the SSPs, the STPs, and the SCPs using the aforementioned SS7 packet switched signaling protocol. The SS7 protocol is used as a network transport layer to facilitate message communication within the CCS network. A regional CCS network, encompassing a region containing the local switching office nearest to the telephone 101 and other switching offices, contains a hierarchy of STPs associated with a hierarchy of SCPs. Each SSP, at local levels nearest to individual user telephones such as 101, connects to two SSPs associated with the respective level. This redundancy is useful to produce high reliability.

Message communications between IPs such as 105 and SCPs such as 111 are conducted in the previously mentioned "SR-3511" signaling protocol. That protocol enables service logic running on the SCPs to coordinate actions with service logic running on the IPs during delivery of telephone services to telephones such as the telephone 101.

Operations of elements 103–111 enable an authorized user of telephone 101 (e.g. the owner of the telephone or an authorized representative of the owner) to administer services to which the owner of the telephone has subscribed (both conventional services, such as call waiting and call forwarding, and new services yet to be defined) without required assistance of operators or other human representatives of the telephone company that interfaces to the telephone.

The SSPs are program-controlled telephone switching systems (either access tandem switches or end officers) without local networks connecting to user telephones in a local subregion. They form local interfaces to the aforementioned CCS network.

The SCPs are stand-alone network systems which, in existing intelligent telephony control networks, have been primary focal points for administration of services provided to PSTN users. An SCP can contain service logic and online, real-time database systems. An SCP provides call processing information and instructions in response to queries received through the CCS network.

The SCPs support multiple applications, each containing logic defining the handling of individuals calls. After determining actions to be performed in response to a specific query, the SCP sends instructions for handling the respective call back to the SSP that initiated the inquiry. Different services/applications may be offered at different SCPs.

The adjuncts 109 are also stand-alone network systems. They are functionally equivalent to SCPs, but each communicates directly with only one locally associated SSP (whereas SCPs can communicate with multiple SSPs, both within and external to a local region or sub-region). In operation, such adjunct networks enable the development and delivery of telephony services which are not totally reliant on SSPs and SCPs for implementation.

It is important to understand that the present invention is not limited to AIN network implementations currently in use in North America and described herein. Many other telephony Intelligent Network implementations are used throughout the world. These other Intelligent Network standards may included other signaling standards and network protocols. Therefore it should be understood that the other Intelligent Network implementations are contemplated and come within the true scope and spirit of this present invention.

Figure 2:
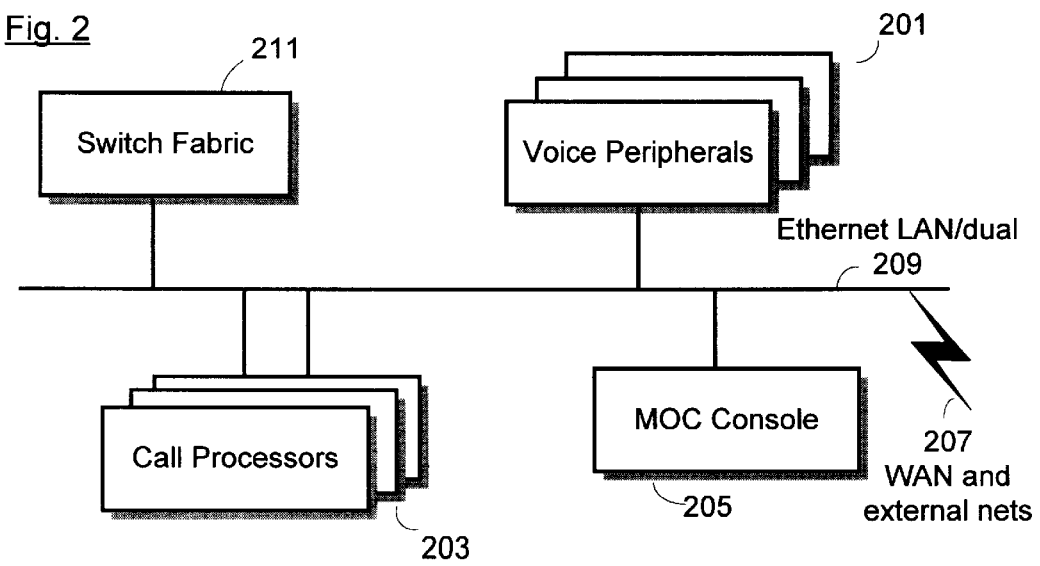
FIG. 2 is a block diagram of the hardware architecture of an intelligent peripheral (IP) system for the AIN system of FIG. 1.

FIG. 2 shows the principal components 200 of the IP system 105 of FIG. 1. The IP system 105 is based upon an IBM MSP/6000 system. Standard elements of an MSP/6000 system include a "switch fabric" complex 211, voice peripherals 201, call processors 203, a maintenance and operations console (MOC) processor 205 are all attached via communications links external EthemettLAN 209 and WAN and external nets 207. Critical components including voice peripheral processors 201 and call processors 203 are configured redundantly to ensure continuous availability in case of any component failure. Further information on the IBM MSP/6000 system can be found in the patent application entitled "Multi-processor systems used as an AIN system" application Ser. No. 08/792,018 by Deborah L. Acker and Thomas E. Creamer and assigned to International Business Machines (IBM) and is incorporated herein by reference. Customize telephony services running on MSP/6000 include detailed billing, call forwarding, call waiting, voice announcements, voice response, keyboard response, debit card call, detailed billing, and peak/off peak charges.

Various new services have been created to take advantage of the convergence of Internet, telephone and cable television services along with other traditional telephony Interactive Voice Response (IVR) services. The use of traditional telephony Interactive Voice Response (IVR) systems incorporated in IP system 105 is known. The popularity of these IVR systems has spread quickly over the last few years for several reasons. The first reason is the substitution of accurate voice recognition techniques to replace DTMF (the dual tone multifrequency signal generated by touch tone telephones) for responding to audio prompts. Today, users are able to speak a desired option, such as "ONE" instead of traditionally only being able to send a DTMF signal by depressing the number one key on a touch tone phone. A second reason is the need for more secure transactions, the use of PINs, passwords and userids are very easy to intercept by third parties. The third reason, is the need for hands free operation in cellular phone environment for safety and convenience. This is especially true in an automobile when driving with a hand held cellular phone. The distraction of depressing telephone numbers has lead to a concern about cellular phone safety in automobiles. And the forth reason is the growing trend of replacing traditional telephone operators and receptionist functions with the more cost effective IVR telephony systems.

The operation of IVR systems is well understood by those skilled in the art. The user prompts from these IVR systems are typically comprised of recorded audio menus or synthesized speech or a combination of both. Two types of speech technology, speech recognition i.e. identifying "what" is said and speaker authentication i.e. identifying "who" is the speaker have been around for years. IVR systems have typically provided only speech recognition techniques, directing users to a desire service or telephone extension based on "what" the user speaks. The use of speech authentication technologies in IVR systems is relatively new. Speech authentication technology for telephony applications is available from many different companies including AT&T, Lucent Technologies, Lernout & Hauspie, Wild Fire, IBM, and Veritel. The basic digital signal processing techniques of cepstrum correlation with sample targets and word-boundary grammar analysis are well understood in the art. Each provider's implementation of these basic techniques is what differentiates their respective offerings. In telephony applications, many of these base speech recognition and speech authentication technologies have been ported to industry standard hardware such as IBM's Direct Talk/6000 operating under AIX. This voice hardware are available in multiple channel configurations providing the capability of handling multiple telephone voice response needs simultaneously.

Figure 3:
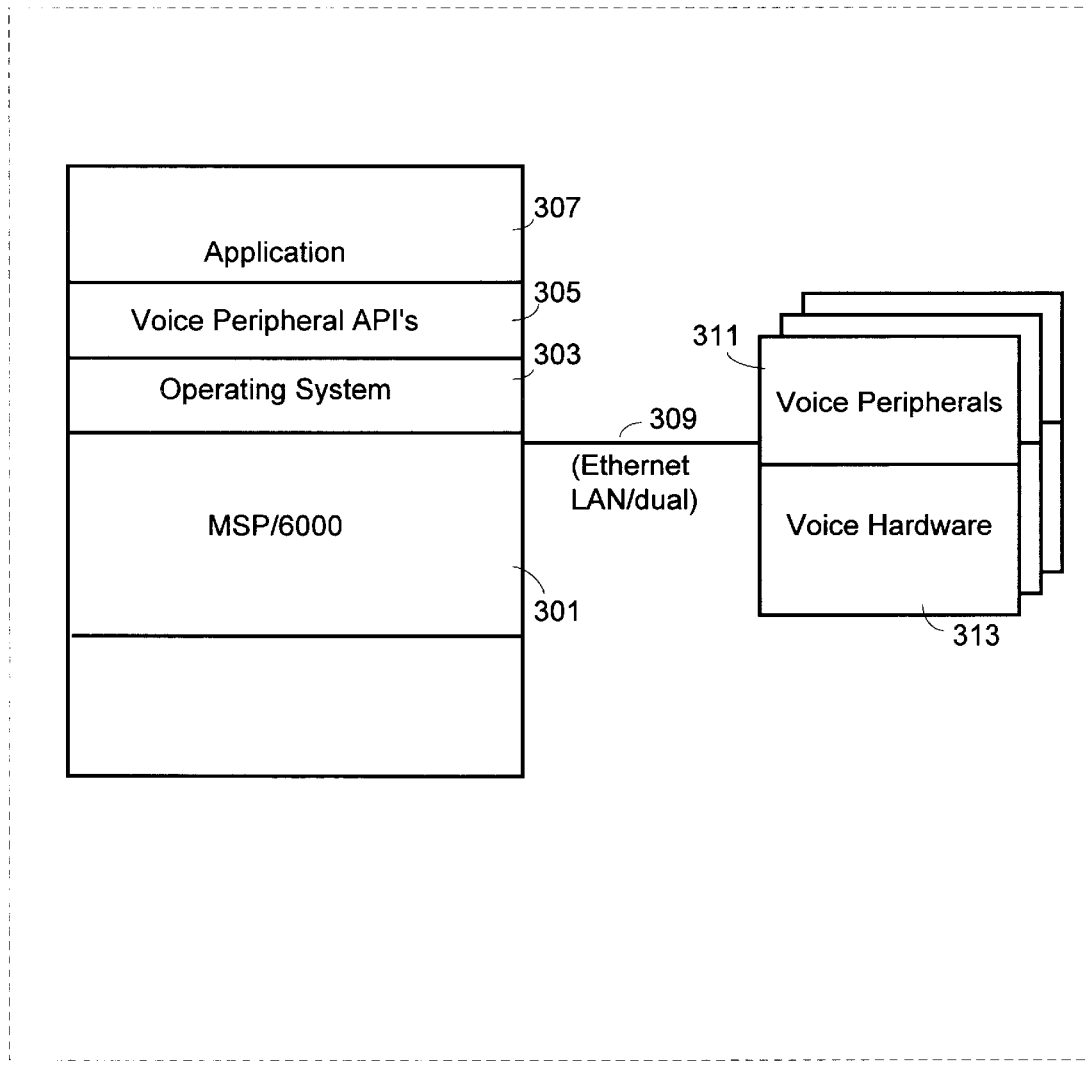
FIG. 3 is a block diagram of an IP system of FIG. 2 with a voice board.

FIG. 3 is a block diagram of an IP system of FIG. 2 with a voice board the AIN system 100 according to the present invention. An IP system 300, as described in FIG. 2. with the associated voice peripherals 311 containing IBM's Direct Talk/6000 voice hardware 313. IP system 300 comprises an IBM MSP/6000 computer hardware platform 301 with an operating system 303 such as AIX, voice peripheral APIs (application programming interfaces) 305 for programmatically communicating with voice hardware 313 on voice peripherals 311 over LAN 309. An application 307 written in any system specific scripting language such as Direct Talk/6000 used to create a desired application. The application 307 can communicate with call databases (not shown) and other services through AIN system.

A customer subscribing to a service using a voice authentication, must first enroll his/her voice with the IP system 300. This process of speaker enrollment is well known in the art for speech authentication systems. Upon initial sign-up, each subscriber using this AIN service is prompted by application 307 to repeat a predetermined series of words over the telephone. The IP system uses these captured speech samples during the speaker authentication process as correlation targets during the cepstrum functions described above.

Figure 4:
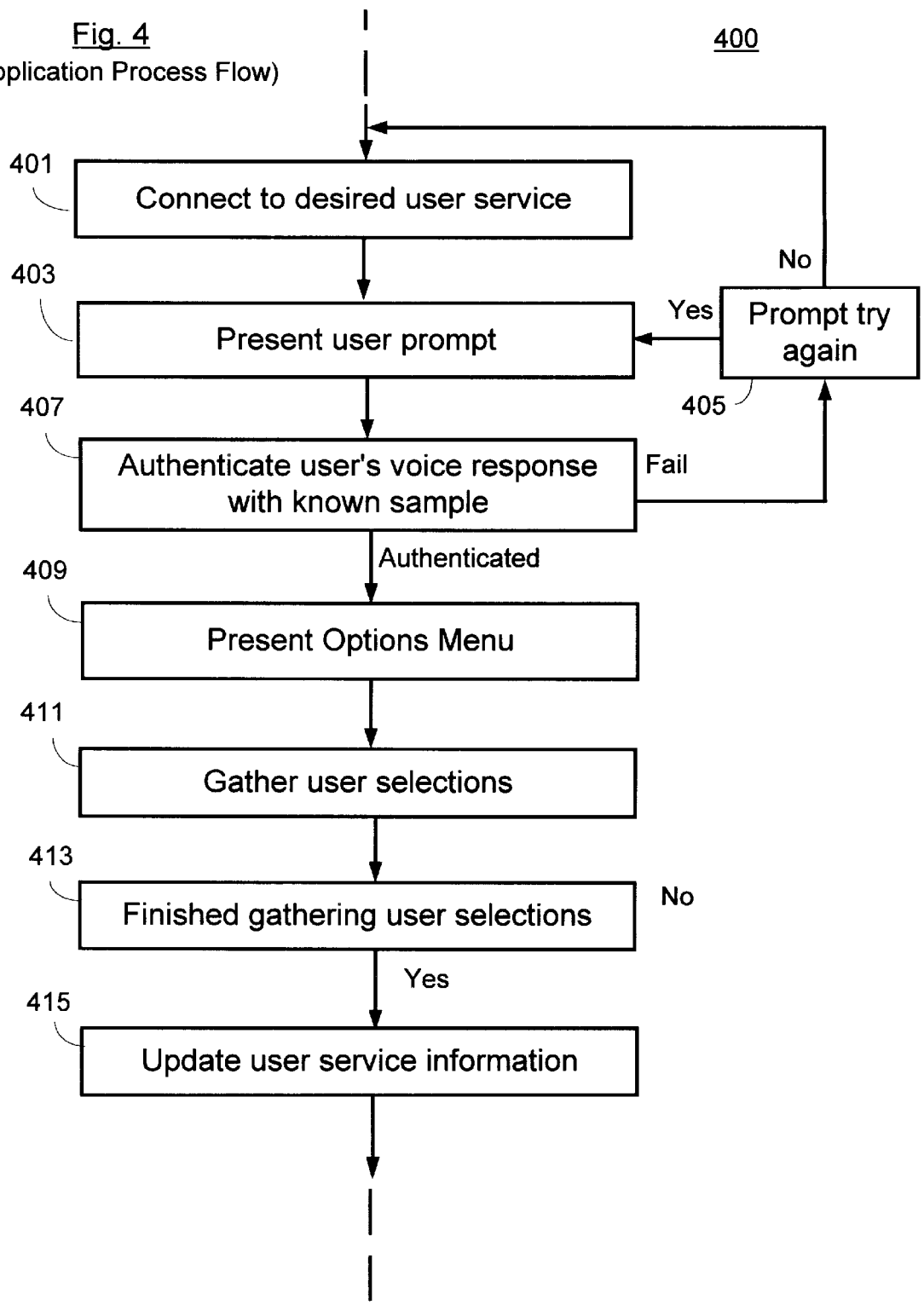
FIG. 4 is an application process flow of an application running on IP system of FIG.3 according to the present invention.

FIG. 4 is an application process flow 400 of an application 307 running on IP system 300 of FIG. 3 according to the present invention. The process begins with the user selecting from a menu of options for a desired service (not shown). ISPs and other providers may provide a plurality of services for a user to choose from.

The process of presenting a user a choice of available service options is well known. Techniques for users to select the desired service based on menu prompts and user response through IVR and/or DTMF are well known. Once a user selects a desired user service, the user is connected to the desire service 401. Next, the user is presented a user prompt 403. The user prompt 403 can be a pre-recorded or synthesized voice prompt running on voice peripheral 311. In another embodiment, all the user prompts consist of multimedia menus presented over a network connection 311 such as the Internet. Following the step of presenting a user prompt 403, the user speaks a response into a telephone 101. In this step 407, the user's voice is authenticated i.e. identifying the source of the voice. The user is typically prompted to response with a predetermined phrase such as "I am Joseph Jones". Voice peripheral 311 with voice hardware 313, samples the spoken phrase and compares it to a known, previously stored target sample. These verification speech authentication and verification techniques are well known in the art as discussed in FIG. 3 above.

If the user's authentication fails, the system would typically give the user a predetermined number of retries by presenting retry prompt 405. The retries allows the system to reduce the statistical probability of rejecting the false negative correlations of step 407. Likewise, the possibility of defeating the correlation function with false positives is kept to a minimum by limiting the number of retries.

Once the user's voice is correlated with a known sample, the user is presented a menu of options that is dependent on the initial service the user has selected. Using the television filtering criteria example, the user may be presented a choice of ranges to set the television broadcast received at the users home. Prompts 409 such as: "Please select the level of violence from the following range. select or say zero for no violence; select or say 1 for minimum violence; select of say 2 for average violence; select of say 3 for above average violence; select of say 4 for no filtering of content based on violence." In this example the user selection for violence is gathered 411. This gathering process (steps 409, 411 and 413) is repeated until the service is finished gathering information. Upon completion of the gathering process steps 409, 411 and 413 the user service information is updated. In this television example, the user's selections for criteria such as violence, obscenity, and other offensive are updated. This information is transmitted over the AIN system 100 to the appropriate subscriber 10 database (not shown). Based on the subscribers criteria, the broadcaster now filters-out undesirable content to be delivered to this particular subscriber.

It should be appreciated that the use of voice authentication makes it very unlikely that other parties, especially children, would be able to defeat or circumvent the parental criteria. In addition, the use of voice authentication would provide a less burdensome alternative to the use of PINs or passwords for parents to remember and keep secure. This application process 400 prompts the user with the key phrase they are asked to repeat so the possibility of forgetting a special code is eliminated. Moreover, this application can be expanded to accommodate other services a provider may wish to offer. For example, a service provider may wish to offer analogous filtering services for Internet access. A parent can call up the service provider and change filtering criteria without the need to learn an end-user application program like CyberPatrol or NetNanny and be freed from the worry that their children can defeat the parental control.

Figure 5:
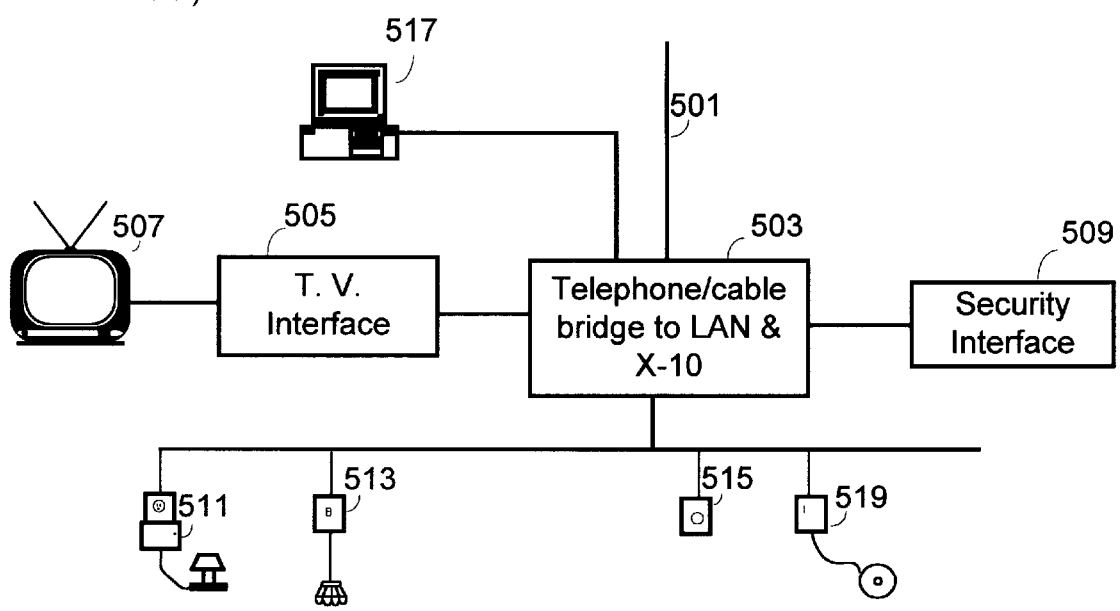
FIG. 5 is a function block diagram of a home control system, for an alternate embodiment of process flow in FIG. 4 according to the present invention.

FIG. 5 is a function block diagram of a home control system, for an alternate embodiment of process flow in FIG. 4 according to the present invention. A cable /or/ telephone line 501 is coupled to a telephone/or/ cable bridge 503. Television interface 505 is coupled to bridge 503. Television interface contains filtering circuitry such as V-chip technology for enabling settings to be programed. A television 507 is connected to T.V. interface 505. It should be noted that Television 507 may have the functionality of interface box 505 built-in and television 507 may connect directly to cable or telephone line 501 without the need for bridge 503 i.e. a cable ready V-chip enabled television set.

In this configuration AIN system 100 with process flow 400 would broadcast filtering codes that are uniquely received by T.V. interface 505 to set the user selection criteria based on the update of the user service information 415. This is different from changing the information broadcasted at the providers end, as described in FIG. 4. In this embodiment the content filtering is performed at the subscribers end. And as in the television provider process example of FIG. 4, the subscriber/user updates their selection criteria using the voice authentication means of process flow 400. Once the criterion updates, this is broadcasted to T.V. Interface 505 to update locally controlled filter criteria. The technique of broadcasting uniquely targeted identifiers is well known in the art. Systems such as pay-per view television and satellite television fee for service systems implement these technologies today. Another technique for reception of filtering criteria by a specified address is through the use of networking techniques such as URLs (uniform resource locators) over the Internet. In this URL embodiment, the subscriber's home bridge 503 would have a unique address and all the locally connected devices such as T.V. interface 505 would include an unique sub-address in the URL.

It is important to note that other subscriber broadcast services are not limited to broadcast television or the Internet. The present invention can work with any program content that a subscriber wishes to control. Other forms of electronically delivered program content includes radio, data, electronic magazines, electronic publications, and music.

In another embodiment, in addition to controlling television broadcast preferences, home control system 500 may include the local control of preferences for a computer 517. The computer, as the Television 507, has the Internet content filtered locally instead of filtered at the ISPs end. Here, as in the television example described above, the user's criteria once set using process flow 400 is broadcasted over cable or telephone cable 501 to set the filtering criteria of computer 517. The computer 517 can use a hardware such as V-chip related technology, software such NetNanny related technology or a combination of both to locally filter Internet content.

In still another embodiment, the user may control home devices through the Internet or telephone of home control system 500. Here bridge 503, includes a LAN or X-10 compatible interface for controlling devices. X-10 is a power-line carrier (PLC) signaling language that enables control signals to be transmitted anywhere over existing household wiring using a plug in controller and appropriately addressed receivers. Each device on the LAN or X-10 network, lamp 511, wall with control 513, thermostatic control 515, pool pump control 519 have unique sub address and programming options depending on the device. A user using AIN system 100 with process flow 400 can choose the desire service to update. As previously discussed, the provider may offer a service to transmit unique codes to X-10 system based on user preferences such as turning on or off select lights.

In another embodiment, the user may control other services over AIN network systems 100 such as banking, billing, electronic commerce, insurance and other financial services that depend on subscriber identification and authentication. For example, a service provider may offer electronic banking where the user can transfer money over the phone by authenticating the transfer with voice rather than a PIN or password.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for controlling subscription services delivered to a user by an Internet Service Provider (ISP) coupled to an Automated Intelligent Network (AIN) telephone system comprising at least one central office switching system, wherein an intelligent peripheral subsystem is connected to said central office switching system, via a call connection channel, said intelligent peripheral subsystem comprising means for providing at least one auxiliary call processing capability via said call connection channel; and wherein said intelligent peripheral subsystem provides a telephony speaker authentication method for selectively authorizing update to user subscription services types provided by said ISP, wherein each of the subscription services types include one or more service options, the method comprising the steps of:

a) prompting for a voice response;
   b) authenticating a user's voice response pattern by performing a speaker-dependent cepstrum matching algorithm with previously stored samples of the user's voice response, and if the user's voice response pattern is positively authenticated with previously stored samples, then performing the steps of:
   c) presenting a menu of user subscription types, each with available AIN service options; and
   d) responding to a user selection of at least one user subscription types, each with service option, by activating a service option selected by said user, wherein said service option is governed by said ISP by regulating one or more Uniform Resource Locator (URL) addresses received by a user subscriber device from said ISP over a telecommunications line.

2. The telephony speaker authentication response method of claim 1, wherein said step c) of presenting a menu of available AIN service options comprises presenting a menu for television broadcast selection.

3. The telephony speaker authentication method of claim 2, wherein said step d) responding to a user selection by invoking a service option selected by said user, further comprises selectively changing said users broadcast reception based upon said user's selection.

4. The telephony speaker authentication method of claim 3, further comprising selectively changing said user's broadcast reception based upon said user's selection through use of V-chip compatible broadcast codes.

5. The telephony speaker authentication method of claim 1, wherein said step c) of presenting a menu of available AIN service options comprises presenting a menu for Internet site filtering services.

6. The telephony speaker authentication method of claim 5, wherein said step d) responding to a user selection by invoking a service option selected by said user, further comprises selectively changing said Internet site filtering services of said user.

7. The telephony speaker authentication method of claim 1, wherein said step c) of presenting a menu of available AIN service options comprises presenting a menu for radio broadcast selection.

8. The telephony speaker authentication method of claim 7, wherein said step d) responding to a user selection by invoking a service option selected by said user, further comprises selectively changing said user's radio broadcast reception based upon said user's selection.

9. The telephony speaker authentication method of claim 1, wherein said step c) of presenting a menu of available AIN service options comprises presenting a menu for control of household devices over a household network coupled to said AIN system.

10. The telephony speaker authentication method of claim 9, wherein said step d) responding to a user selection by invoking a service option selected by said user, further comprises selectively controlling said household device over said household network coupled to said AIN system.

11. The telephony speaker authentication method of claim 1, wherein said intelligent peripheral subsystem is based on an IBM MSP/6000 system.

12. The telephony speaker authentication system of claim 1, wherein said means for presenting a menu of available AIN service options comprises means for presenting a menu for television broadcast selection.

13. The telephony speaker authentication system of claim 12, wherein said means for responding to a user selection by invoking a service option selected by said user, further comprises means for selectively changing said users broadcast reception based upon said user's selection.

14. The telephony speaker authentication system of claim 13, further comprising means for selectively changing said users broadcast reception based upon said users selection through use of V-chip compatible broadcast codes.

15. An Automated Intelligent Network (AIN) telephone system comprising at least one central office switching system coupled to an Internet Service Provider (ISP) for controlling subscription services delivered to a user by said ISP, wherein an intelligent peripheral subsystem is connected to said central office switching system, via a call connection channel, said intelligent peripheral subsystem comprising means for providing at least one auxiliary call processing capability via said call connection channel; and wherein said intelligent peripheral subsystem provides a telephony speaker authentication system for selectively authorizing updates to user subscription services types provided by said ISP, wherein each of the subscription services types include one or more service options, the system comprising:

a) means for prompting for a voice response;
   b) means for authenticating a user's voice response pattern by performing a speaker-dependent cepstrum matching algorithm with previously stored samples of the user's voice response;
   c) means for presenting a menu of user subscription types, each with available AIN service options; and
   d) means for responding to a user selection of at least one user subscription types, each with service option by activating a service option selected by said user, if the user's voice response pattern is positively authenticated with previously stored samples user, wherein said service option is governed by said ISP by regulating one or more Uniform Resource Locator (URL) addresses received by a user subscriber device from said ISP over a telecommunications line.

16. The telephony speaker authentication system of claim 15, wherein said means of presenting a menu of available AIN service options comprises means for presenting a menu for Internet site filtering services.

17. The telephony speaker authentication system of claim 16, wherein said means for responding to a user selection by invoking a service option selected by said user, further comprises means for selectively changing said Internet site filtering services of said user.

18. The telephony speaker authentication system of claim 15, wherein said method of presenting a menu of available AIN service options comprises means for presenting a menu for radio broadcast selection.

19. The telephony speaker authentication system of claim 18, wherein said means for responding to a user selection by invoking a service option selected by said user, further comprises means for selectively changing said user's radio broadcast reception based upon said user's selection.

20. The telephone speaker authentication system of claim 15, wherein said means for presenting a menu of available AIN service options comprises means for presenting a menu for control of household devices over a household network coupled to said AIN system, said household devices selected from the group of household devices consisting of lamps, pumps, thermostats and appliances.

21. The telephony speaker authentication system of claim 20, wherein said means for responding to a user selection by invoking a service option selected by said user, further comprises means for selectively controlling said household device over said household network coupled to said AIN system.

22. The telephony speaker authentication system of claim 15, wherein said intelligent peripheral subsystem is based on an IBM MSP/6000 system.

23. A method for controlling subscription services delivered to a user by an Internet Service Provider (ISP) coupled to an Automated Intelligent Network (AIN) telephone system comprising at least one central office switching system, wherein an intelligent peripheral subsystem is connected to said central office switching system, via a call connection channel, said intelligent peripheral subsystem comprising means for providing at least one auxiliary call processing capability via said call connection channel; and wherein said intelligent peripheral subsystem provides a telephony speaker authentication method for selectively authorizing updates to user subscription services types provided by said ISP, wherein each of the subscription services types include one or more service options, the method comprising the steps of:

a) prompting for a voice response;
b) authenticating a user's voice response pattern by performing a speaker-dependent cepstrum matching algorithm with previously stored samples of the user's voice response, and if the user's voice response pattern is positively authenticated with previously stored samples, then performing the steps of:
c) presenting a menu of user subscription types, each with available AIN service options; and
d) responding to a user selection of at least one user subscription types, each with service option, by activating a service option selected by said user, wherein said service option is governed by said ISP by regulating one or more Uniform Resource Locator (URL) addresses: (i) received by a user subscriber device from said ISP over a telecommunications line and/or (ii) received by a user subscriber device from said ISP over a telecommunication to further regulate one or more Uniform Resource Locator (URL) addresses over a local area network coupled to the subscriber device.

24. An Automated Intelligent Network (AIN) telephone system comprising at least one central office switching system coupled to an Internet Service Provider (ISP) for controlling subscription services delivered to a user by said ISP, wherein an intelligent peripheral subsystem is connected to said central office switching system, via a call connection channel, said intelligent peripheral subsystem comprising means for providing at least one auxiliary call processing capability via said call connection channel; and wherein said intelligent peripheral subsystem provides a telephony speaker authentication system for selectively authorizing updates to user subscription services types provided by said ISP, wherein each of the subscription services types include one or more service options, the system comprising:

a) means for prompting for a voice response;
b) means for authenticating a user's voice response pattern by performing a speaker-dependent cepstrum matching algorithm with previously stored samples of the user's voice response;
c) means for presenting a menu of user subscription types, each with available AIN service options; and
d) means for responding to a user selection of at least user subscription types, each with one service option by activating a service option selected by said user, if the user's voice response pattern is positively authenticated with previously stored samples user, wherein said service option is governed by said ISP by regulating one or more Uniform Resource Locator (URL) addresses: (i) received by a user subscriber device from said ISP over a telecommunications line and/or (ii) received by a user subscriber device from said ISP over a telecommunication to further regulate one or more Uniform Resource Locator (URL) addresses over a local area network coupled to the subscriber device.

* * * * *